UNITED STATES PATENT OFFICE.

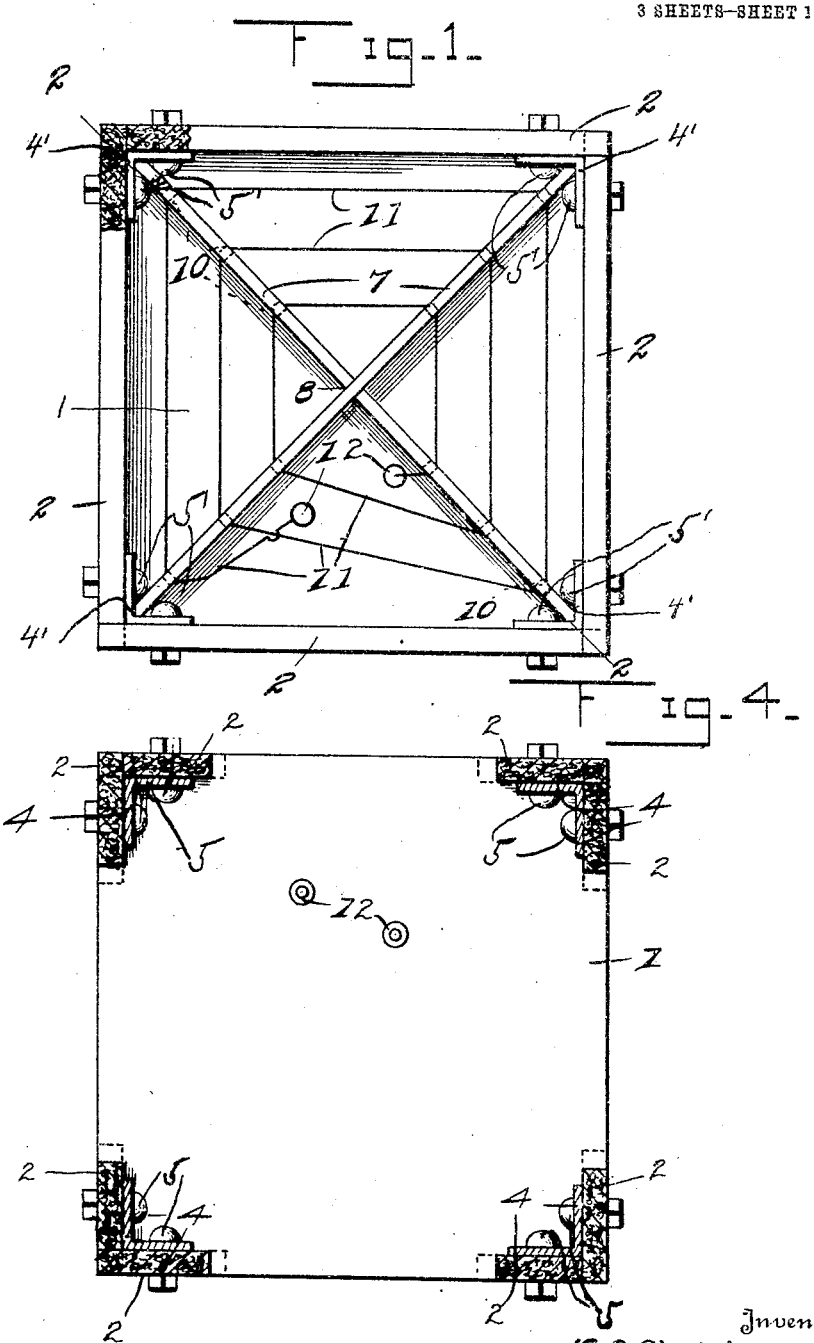

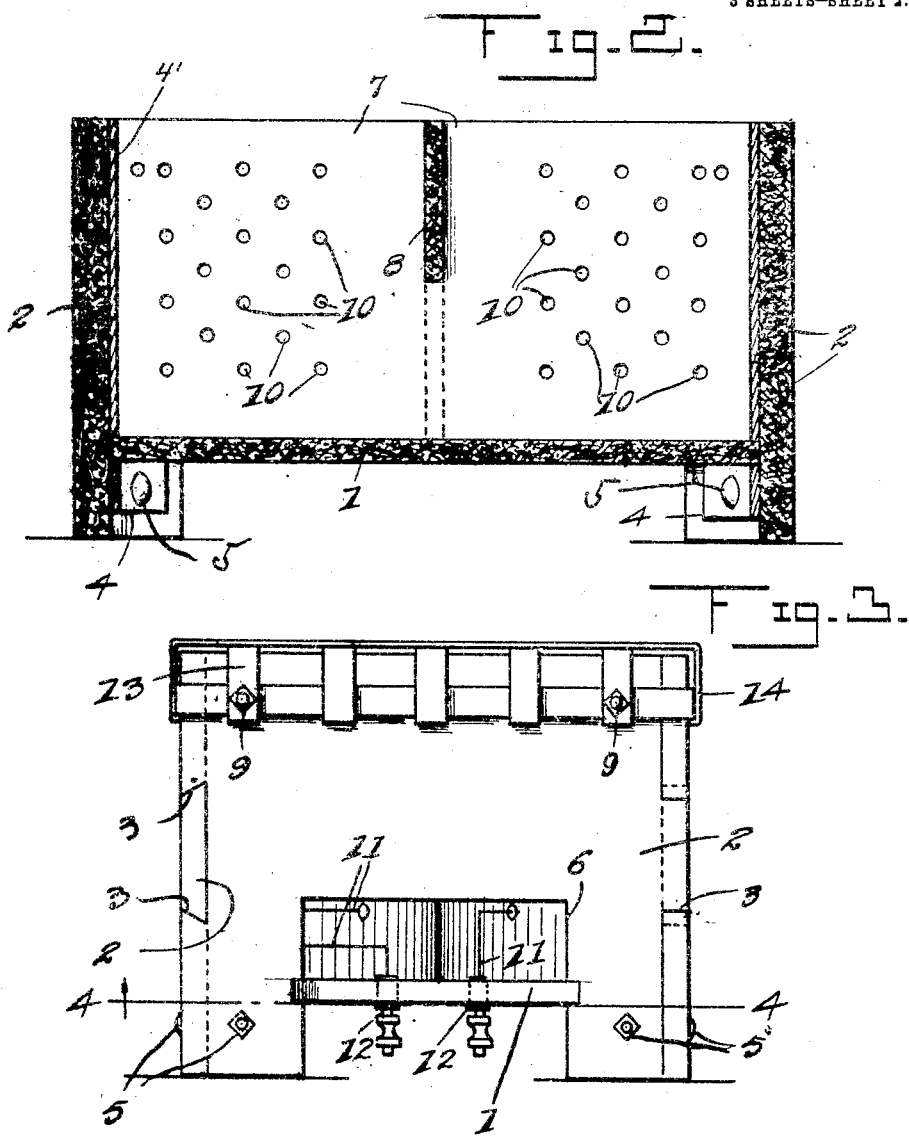

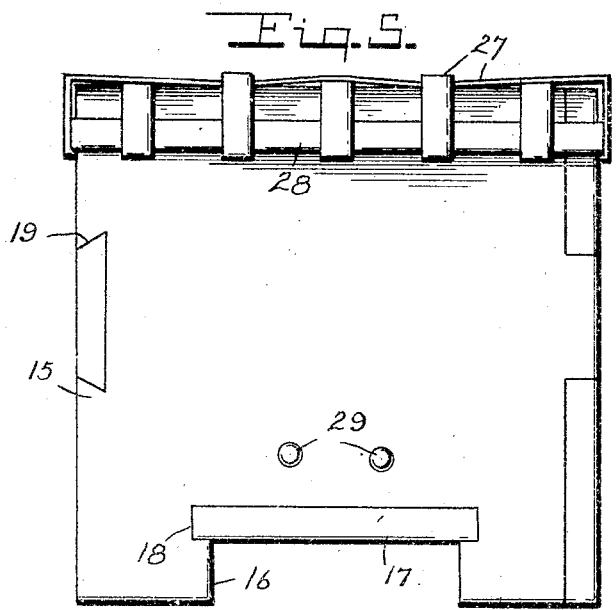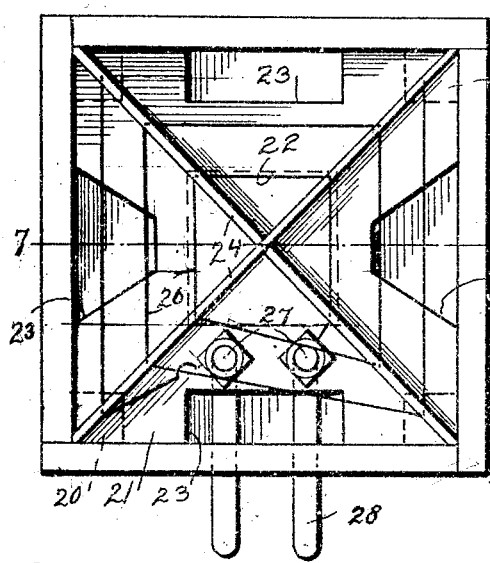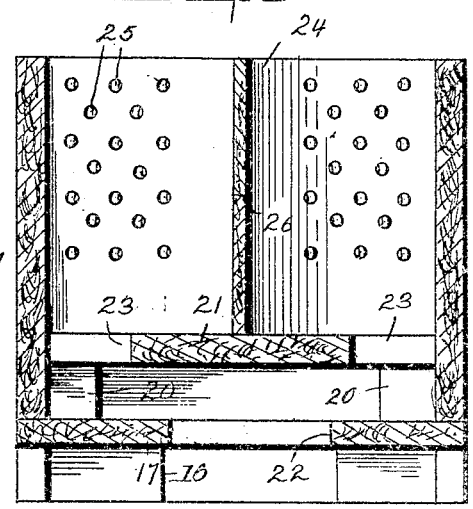

ARTHUR O. CHRISTENSEN, OF FRANKLIN FURNACE, NEW JERSEY.

ELECTRIC HEATING AND COOKING STOVE.

1,133,098.

Specification of Letters Patent. Patented Mar. 23, 1915.

Application filed September 25, 1914. Serial No. 863,501.

*To all whom it may concern:*

Be it known that I, ARTHUR O. CHRISTENSEN, a citizen of the United States, residing at Franklin Furnace, in the county of Sussex and State of New Jersey, have invented certain new and useful Improvements in Electric Heating and Cooking Stoves; and I do hereby declare the following to be a full, clear, and exact description of the invention, such as will enable others skilled in the art to which it appertains to make and use the same.

This invention comprehends certain new and useful improvements in electric heating and cooking stoves, and has for its primary object to provide a stove of this character which will be exceedingly simple and cheap in construction and highly efficient in use.

Another object is to provide a stove of this character which will be formed in such manner that a continual circulation of air through the same and over the heating coils may be had, thereby increasing the efficiency of the stove and still permitting the same to serve as either a heating stove or a cook stove.

The invention has for a further object to provide an electric stove which will be formed in such manner that the heating coils or wires thereof will be exposed to view and yet be thoroughly protected and prevented from coming in contact with the clothes or other inflammable material and thereby causing a fire.

The invention has for a further object to provide a stove of this character, the body of which will be constructed of non-heat conducting material or poor heat conducting material and in which may be positioned and supported a plurality of cross members or plates formed of a material which is not conductive electrically and provided with openings through which a heating coil or wire is extended and connected to binding posts, a suitable cover being provided for the body of the stove to protect the coils or wires over which an electric current may pass, the coils or wires being in the path of the draft of air passing through the body of the stove.

The invention has for a further object to provide a stove of this character which will be constructed in such manner that when used as a heating stove, the air passing over and between the wires will serve to keep them comparatively cool.

The invention has for a still further object to provide a stove of this character which will be constructed in such manner that when used as a cooking stove, the object to be heated may rest upon the top of the stove and thereby shut off the passage of hot air from the top of the stove, causing the wires to become much hotter, thereby reducing their electrical conductivity and reducing the consumption of electricity while the heat produced is intensified and confined by the poor heat conducting walls, causing the heated air to be concentrated on the object to be heated.

The invention has for a still further object to generally improve and simplify the construction and operation of devices of this character and increase the efficiency thereof without materially increasing the cost of the same.

With these and other objects in view as will become more apparent as the description proceeds, the invention consists in certain novel features of construction, combination and arrangement of parts as will be hereinafter more fully described and claimed.

For a complete understanding of my invention reference is to be had to the following description and accompanying drawings, in which:

Figure 1 is a top plan view of the stove with the screen or cover removed. Fig. 2 is a diagonal vertical section on the plane of line 2—2 of Fig. 1. Fig. 3 is a front elevation of the stove with the screen or cover in position. Fig. 4 is a transverse sectional view on the plane of line 4—4 of Fig. 3, looking in the direction indicated by the arrow. Fig. 5 is a front elevation of a modified form of the device with the cover in position. Fig. 6 is a top plan view of the modified form of the device with the cover removed, and Fig. 7 is a transverse vertical section on the plane of line 7—. of Fig. 6.

Referring more particularly to the drawings in which similar reference characters designate corresponding parts throughout the several views, 1 designates the bottom of the stove which is suitably secured in the sides 2 of the frame or body of the stove which have their vertical edges interlocked, as shown at 3. The corner supporting blocks or plates 4 are secured in the corners of the body of the stove adjacent the bottom thereof, by suitable securing members 5 passed through the same and through the adjacent edges of the sides of the body and it will be evident that the supporting blocks or plates 4 coöperate with the corner member 4' to strengthen the frame or body of the stove and prevent outward movement of the sides 2 thereof. It will further be understood that the corner members 4' are in the form of right angled plates and positioned in the corners of the stove body and secured in position by suitable securing members 5' and that the lower edge of the corner members 4' are spaced from the upper edges of the corner supporting blocks or plates 4 a sufficient distance to accommodate the corners of the bottom 1 which rests upon the supporting blocks or plates 4 which are also preferably formed of angle iron.

The bottom 1 and sides 2 of the body of the stove are preferably formed of asbestos board or other suitable poor heat conducting material of sufficient strength to withstand the strain to which a stove body of this character is liable to be subjected.

Each of the four sides 2 of the body is provided with a central draft opening extending upwardly from the lower edge of said sides 2 and indicated by the numeral 6. The draft openings 6 extend from the floor to a suitable distance above the bottom of the stove body to permit air to enter the stove body immediately above the bottom 1 and pass upwardly in said body and out of the open top thereof, the air being heated as it travels upwardly in the stove frame, as will readily be apparent.

Positioned vertically in the stove body and having interlocking engagement with one another, are the crossed wire supporting plates 7 which extend from the upper face of the bottom 1 to the upper edge of the sides 2 of the stove body, said plates 7 being interlocked with one another by means of the transverse slits 8, each plate having its slit extending inwardly from one side only to the center thereof and one of said plates being inverted so that when the plates are forced together and interlocked, their upper and lower edges are flush with one another.

The plates 7 are positioned diagonally in the stove body and have their opposite faces beveled along their vertical edges for engagement in the corner members 4' to positively prevent movement of the plates 7. The plates are provided in their body portions with vertical and horizontal rows of perforations 10 to opposite sides of the crossed and interlocked centers of said plates 7 to receive a suitable heating wire 11 which may be passed through the perforations 10 in any suitable manner and has its opposite ends secured to the binding posts 12 secured in suitable openings in the bottom 1 and by means of which the wire 11 may be connected with any suitable source of electric energy. It will be understood that the perforations of each row are preferably offset from the perforations of the adjacent row or rows and any suitable number of rows of perforations may be provided in each half of each plate 7. It will further be understood that any suitable wire having sufficient electrical resistance so as not to require an excessive length of wire, and which will not deteriorate by being subjected to heat and air and will serve as a heat distributing or heating wire, may be employed. It will be understood, however, that the wire 11 is to be passed through the perforations 10 in such manner as not to cross the wire and while, as previously stated, any suitable wire may be employed, I prefer to employ nichrome ribbon.

It will be evident, that during use of the stove, there will be a continuous circulation of air through the body from the draft openings 6 to the top of the stove and out of the same, the air coming in contact with the heating wire 11 and being heated thereby as it passes upwardly through the body of the stove. It will further be seen that the bottom 1 will serve to protect the floor or other support upon which the stove is positioned and eliminate all danger of setting fire to the same.

In order to protect the heating wire 11 and also prevent objects from falling into the stove, I have provided a screen or cover 13 formed of punched steel metal, wire screening, or suitable strips of metal or the like placed across one another and overlapped, as will be readily apparent from Fig. 3 of the drawings, thereby providing spaces between the strips for the passage of the heated air, said spaces being of such size, however, that it will be impossible for large articles to pass through the same and drop upon the wire 11.

In Figs. 5 to 7 inclusive I have shown a modified form of the invention in which the sides 6 are of substantially the same construction as in the preferred form of the device with the exception of the central openings 16 in the lower portions thereof, which extend upwardly only to the bottom or lower face of the bottom 17 of the stove body. The bottom 17 is secured in the sides 15 of the body of the stove by having its edges extended in recesses 18 in the vertical edges of the openings 16, as clearly shown in Fig. 5 and the sides 15 may be secured together with interlocking dovetailed extensions formed along their vertical edges and secured in corresponding recesses, as clearly shown at 19 in Fig. 5. The sides 15 may be secured together in any suitable or well known manner and the material of which the sides 15 are formed may be asbestos or any other poor heat conducting material. Positioned upon the opposite corners of the bottom 17 are the corner supporting blocks 20 which serve to support the horizontal partition 21 a spaced distance above the bottom 17, and while the bottom 17 is provided with a central air passage 22, the horizontal partition 21 is provided with side air passages 23 in the four sides thereof and extending inwardly for spaced distances from the edges of said horizontal partition 21. The lower or bottom edges of the diagonal crossed wire supporting plates 24 rest upon the upper face of the horizontal partition 21 and are provided with the horizontal and vertical rows of perforations 25 the same as the supporting plates in the preferred form of the device with the perforations of one row offset from the perforations of the adjacent row or rows and adapted to receive a current conducting wire 26 passed through said perforations 25 in such manner as to eliminate danger of crossing the wire 26 at any point, the opposite ends of said wire 26 being secured to the binding posts 27, extending upwardly through the horizontal partition 21 and comprising the threaded upstanding inner ends of the rods 28, the main portions of which extend horizontally and are engaged through suitable openings 29 formed in the front side of the body of the stove between the bottom 17 and horizontal partition 21. It will be understood that the partitions of supporting plate 24 are each provided with inwardly directed slits the same as in the preferred form, in order that the supporting plates 24 may be interlocked as they are crossed at their center after inverting one plate, as clearly shown at 26 Fig. 7. It will also be understood that the stove shown in the modified form may be provided with a cover similar to the form of cover used in the preferred form of the device and consisting of the crossed strips 27 having their opposite ends bent downwardly and secured to a lower continuous strip 28, as clearly shown in Fig. 5 of the drawings.

While the preferred embodiments of the invention have been shown and illustrated, it will be understood that minor changes in the details of construction, and arrangements of parts may be made without departing from the spirit and scope of the invention as claimed or sacrificing any of the advantages thereof. For example, the stove may be provided with any form of protecting cover or an inclosing casing.

What is claimed is:—

A device of the class described comprising a stove body including sides connected along their vertical edges, a bottom within said sides, said bottom having a central air passage, a horizontal partition spaced above said bottom and having side air passages, corner blocks positioned upon said bottom for supporting said horizontal partition, crossed supporting plates positioned in said body and having their lower edges resting upon said horizontal partition, said supporting plates being interlocked at their crossed centers, binding posts positioned through one side of the body and upwardly through the horizontal partition, and a heating wire engaged through openings in the supporting plates and having its opposite ends secured to said binding posts.

In testimony whereof I affix my signature in presence of two witnesses.

ARTHUR O. CHRISTENSEN.

Witnesses:
   CHARLES K. CLOPPER,
   BEULAH M. CLOPPER.